(12) United States Patent
Mitzman

(10) Patent No.: US 8,991,852 B2
(45) Date of Patent: Mar. 31, 2015

(54) COLLAPSIBLE PUSHCHAIR

(75) Inventor: Richard Mitzman, London (GB)

(73) Assignee: Step Ahead Corporation Limited (GB)

(*) Notice: Subject to any disclaimer, the term of this patent is extended or adjusted under 35 U.S.C. 154(b) by 0 days.

(21) Appl. No.: 14/008,115

(22) PCT Filed: Dec. 20, 2011

(86) PCT No.: PCT/GB2011/052535
§ 371 (c)(1),
(2), (4) Date: Oct. 20, 2013

(87) PCT Pub. No.: WO2012/131285
PCT Pub. Date: Oct. 4, 2012

(65) Prior Publication Data
US 2014/0028001 A1   Jan. 30, 2014

(30) Foreign Application Priority Data
Mar. 31, 2011  (GB) .................................. 1105412.9

(51) Int. Cl.
*B62B 1/00* (2006.01)
*B62B 7/08* (2006.01)
(Continued)

(52) U.S. Cl.
CPC . *B62B 7/08* (2013.01); *B62B 5/067* (2013.01); *B62B 7/066* (2013.01); *B62B 7/004* (2013.01); *B62B 2205/22* (2013.01); *B62B 2205/26* (2013.01)
USPC ....................................................... 280/642

(58) Field of Classification Search
USPC ......... 280/33.993, 47.38, 639, 642, 643–644, 280/647, 648–650, 658; 297/195.13, 218.1, 297/218.2, 218.3, 219.12, 440.11
See application file for complete search history.

(56) References Cited

U.S. PATENT DOCUMENTS 5,833,261 A * 11/1998 Brown et al. ................. 280/642
6,412,809 B1   7/2002 Bigo et al.
(Continued)

FOREIGN PATENT DOCUMENTS

CA        2657144 A1   9/2010
CN     201272388 Y    7/2009
(Continued)

OTHER PUBLICATIONS

Examination Report dated Jul. 21, 2011 issued by the UK Patent Office in counterpart Great Britain Application No. GB1105412.9.
(Continued)

*Primary Examiner* — John Walters
*Assistant Examiner* — James Triggs
(74) *Attorney, Agent, or Firm* — Rhodes Donahoe, LLC

(57) ABSTRACT

A collapsible pushchair is disclosed. It comprises a chassis (2) to which wheels (8, 9, 25, 26) are attached, a seat hanger (33) and a pair of spaced parallel tubular body portions (6,7) fixed relative to and extending upwardly at an angle from the chassis away from the wheels on opposite sides of said seat hanger. A first handle part (15) is received in each tubular body portion and is slideable between an extended position in which the first handle part (15) primarily extends from an upper end of the tubular body portion (6,7) towards a person pushing the pushchair and, a second stowed position in which the first handle part (15) has been slid through each tubular body portion (6,7) so that the first handle part extends from the upper end and a lower end of each of the tubular body portions. The seat hanger is pivotally attached to said first handle parts such that the seat hanger (33) folds as the first handle parts (15) are slid into their stowed position from their extended positions.

27 Claims, 10 Drawing Sheets

(51) Int. Cl.
  *B62B 5/06* (2006.01)
  *B62B 7/06* (2006.01)
  *B62B 7/00* (2006.01)

(56) References Cited

U.S. PATENT DOCUMENTS

| | | | | |
|---|---|---|---|---|
| 6,712,382 B2* | 3/2004 | Song | ............................ | 280/642 |
| 7,717,456 B2* | 5/2010 | Chen et al. | .................... | 280/642 |
| 2004/0026896 A1* | 2/2004 | Crisp | ............................ | 280/642 |
| 2008/0185821 A1* | 8/2008 | Chen et al. | .................... | 280/642 |

FOREIGN PATENT DOCUMENTS

| | | |
|---|---|---|
| DE | 9414168 U1 | 11/1994 |
| FR | 2736321 | 10/1997 |
| GB | 2162801 | 2/1986 |
| NL | 1030329 | 5/2007 |
| WO | 2010052257 A1 | 5/2010 |

OTHER PUBLICATIONS

International Search Report dated Apr. 5, 2012 issued in the counterpart PCT Application No. PCT/GB2011/052535.

* cited by examiner

COLLAPSIBLE PUSHCHAIR

This invention relates to a collapsible pushchair for infants otherwise known as a baby buggy or stroller and more particularly to a pushchair which can be easily collapsed for storage or transportation when not in use. Ideally, the invention relates to a puschair that can be collapsed to a size which is extremely compact and acceptable as carry-on luggage on an aeroplane.

Collapsible pushchairs are well known. Generally these have a number of tubular frame members to which a seat is attached. Braces extend between and are pivotally attached to the frame members so as to support the frame members and control the folding process. Often, the members or braces are pivotally connected to each other so that the pushchair will fold in a generally scissor like fashion with the frame members and braces folding onto or against each other so that the pushchair assumes a more compact configuration suitable for storage when not in use.

A problem with known pushchairs is that they generally have a complicated construction and are difficult to collapse and open ready for use. In particular, the arrangement of pivots and braces that provides the mechanism that allows the pushchair to fold is complex and makes the pushchair difficult and expensive to manufacture. The folding mechanism also presents a number of opportunities for fingers to become trapped between tubular members or braces during the folding procedure resulting in injury.

Conventional pushchairs are generally still relatively large when collapsed and so take up considerable space at home or in the boot of a car. They also have to be loaded onto aircraft separately because they do not meet the carry-on baggage size regulations.

Although some pushchairs can be collapsed to a relatively small size, it is often necessary to remove the seat before collapsing the frame and fold or store the seat separately. Alternatively, the seat must be folded up independently and prior to collapsing the frame.

The present invention therefore seeks to provide an improved collapsible pushchair which overcomes or substantially reduces some or all of the aforementioned disadvantages and is very easy to collapse and erect.

A collapsible pushchair is known from WO2010/052257.

According to the present invention, there is provided a collapsible pushchair comprising a chassis to which wheels are attached, a seat hanger and a pair of spaced parallel tubular body portions fixed relative to and extending upwardly at an angle from the chassis away from the wheels on opposite sides of said seat hanger, a first handle part received in each tubular body portion and slideable between an extended position in which the first handle part primarily extends from an upper end of the tubular body portion towards a person pushing the pushchair and, a second stowed position in which the first handle part has been slid through each tubular body portion so that the first handle part extends from the upper end and a lower end of each of the tubular body portions, wherein the seat hanger is pivotally attached to said first handle parts such that the seat hanger folds as the first handle parts are slid into their stowed position from their extended position.

In a preferred embodiment, the seat hanger is also attached to the spaced parallel tubular body portions.

The seat hanger preferably comprises first and second portions, an upper end of the first portion being pivotally attached to said first handle parts and, a front end of the second portion being pivotally attached to said spaced tubular body portions, a lower end of said first portion and a rear end of said second portion being pivotally attached to each other such that, when the first handle parts are slid into their stowed positions, the upper end of the first portion moves linearly towards the front end of the second portion whilst the lower end of said first portion and rear end of the second portion pivot relative to each other, to fold the seat hanger. Advantageously, the first and second portions may substantially lie between the pair of spaced parallel tubular body portions when the first handle parts are in their stowed position.

In a preferred embodiment, the seat hanger comprises a coupling member that pivotally couples the lower end of said first portion to the rear end of said second portion.

The coupling member may comprise spaced parallel seats to receive and pivotally mount the lower end of the first portion and the rear end of the second portion, respectively.

In a preferred embodiment, the first and second portions each comprise rigid U-shaped frame members and the coupling member extends between a base part of each U-shaped frame member to couple said U-shaped frame members together with their base parts in spaced parallel relation.

Preferably, the first U-shaped frame member is coupled to the coupling member for rotation about a first axis and the second U-shaped frame member is coupled to the coupling member for rotation about a second axis parallel to and spaced from the first axis.

In one embodiment, respective ends of the U-shaped frame member of the first portion are attached to respective first handle portions for rotation about a first common axis. Furthermore, respective ends of the U-shaped frame member formed by the second portion may be attached to respective spaced tubular body portions for rotation about a second common axis.

Preferably, the first axis, the second axis and the first and second common axes are all parallel to each other.

In a preferred embodiment, a flexible seating material is attachable to the U-shaped frame members to provide a seat and a backrest, wherein the flexible seating material folds up with the U-shaped frame members when the first handle parts are slid into their stowed position.

In a preferred embodiment, the tubular body portions and the first handle part are configured such that substantially the same length of the first handle part protrudes from the upper and lower ends of each tubular body portion when the first handle part is in its second stowed position.

The tubular body portions and the first handle part may be configured such that, when the first handle part has been slid through each of its tubular body portions into its stowed position, the pushchair can be moved into an upright position in which it is supported on said wheels and the first handle part protruding from the lower end of the tubular body portions.

In one embodiment, the lower ends of the first handle part are received within their corresponding tubular body portions when the first handle part is in its extended position.

In an alternative embodiment, the lower ends of the first handle part may protrude from the lower end of each of the tubular body portions when the first handle part is in its extended position. Preferably, only a very small length of the first handle part protrudes from the lower end of the tubular body portions.

In a preferred embodiment, caps or abutment members are attached to the lower ends of the first handle part to prevent the first handle part from being pulled through the tubular body portions when the first handle part is extended.

Preferably, the end caps comprise feet to support the pushchair in an uptight position when the first handle part is in its stowed position.

In a preferred embodiment, the pushchair comprises a locking mechanism to lock the first handle part in its extended and stowed positions within the tubular body portions.

Preferably, the pushchair comprises a second handle part, the second handle part being slideable between a first position in which it extends upwardly from an end of the first handle part towards a person pushing the pushchair and a retracted position in which it is received within the first handle part.

In one embodiment, the first handle part can comprise a separate tubular member received in each tubular body portion and the second handle part comprises a U-shaped frame member that extends from the upper end of each of the separate tubular members and connects them together so that, when the second handle part is retracted within the separate tubular members, further downward force on the second handle part simultaneously pushes both separate tubular members through their respective tubular body portions so that the first handle part is moved from its extended toward its retracted position.

Preferably, the wheels comprise a primary wheel attached to the chassis adjacent to the lower end of each of the tubular body portions. The pushchair advantageously also comprises a pair of secondary wheels located behind the primary wheels and stowable between the primary wheels when the pushchair is collapsed.

In a preferred embodiment, a pair of parallel arms extends from the chassis, a secondary wheel being connected to each of said arms. Each of said arms may be pivotally mounted to the chassis and comprise two portions pivotally connected to each other such that the each arm pivots relative to the chassis and the two portions pivot relative to each other when the secondary wheels are moved into their stowed position between the primary wheels.

In a preferred embodiment, a stay extends between each of the secondary wheels and the upper end of the tubular body portion. Ideally, the stay is pivotally attached to the tubular body portion such that the stay pivots relative to the tubular body portion when the secondary wheels are moved into their stowed position between the primary wheels.

Preferably, the pivotal attachment of the stay to the tubular body portion is spaced from the tubular body portion in a direction towards the secondary wheels to provide a space between the tubular body portion and the stay to receive the arms when the secondary wheels are received in their stowed position between the primary wheels.

The chassis may be moulded from any suitable rigid plastics material such as mineral filled polypropylene.

Preferably the secondary wheels are retained in their stored position in the chassis by means of a releasable latch mechanism. Preferably the means which connect the secondary wheels to the chassis operate so that said wheels automatically unfold from the chassis under the action of gravity when the releasable latch mechanism retaining them in the chassis in their stowed position is released.

Embodiments of the invention will now be described, by way of example only, with reference to the accompanying drawings in which.

Figure 1:
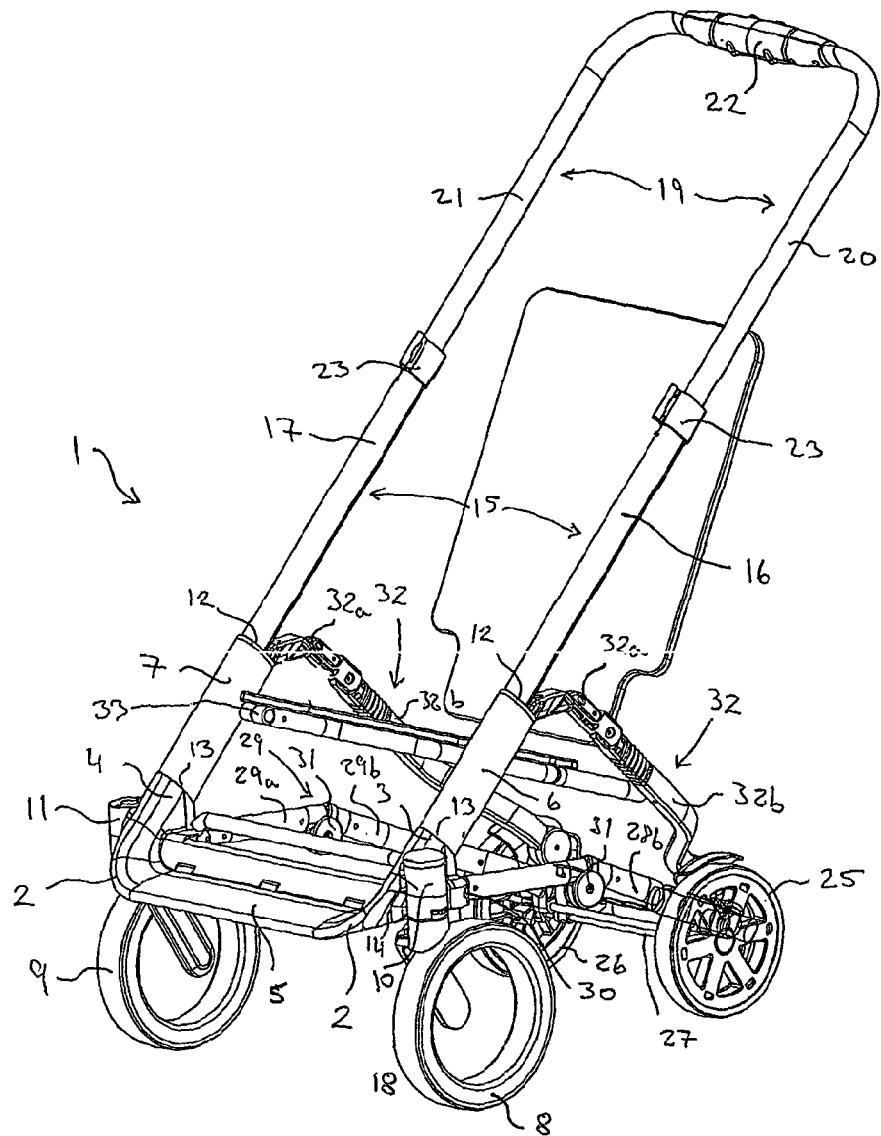
FIG. 1 is a schematic perspective view of a pushchair in its erect configuration according to an embodiment of the invention.

Referring to the drawings, there is shown in FIGS. 1-4 a collapsible pushchair 1 which comprises a rigid one-piece moulded plastics chassis 2 having opposite sides 3, 4 and an integral footrest 5 extending between said sides 3,4. A tubular body portion 6,7 extends upwardly at an angle from each side 3,4 of the chassis 2. A front or primary wheel 8,9 is attached to each side 3,4 of the chassis 2 via a pivot support 10,11.

Each of the tubular body portions 6,7 are open at both their upper ends 12. The lower end 13 of each tubular body portion 6,7 is connected to a generally tubular and similar sized portion of the chassis 2 on each side 3,4 which is also open at its lower end 14 so that each tubular body portion 6,7 together with its respective chassis side 3,4 to which it is attached has a longitudinal passage extending all the way through it.

Figure 2:
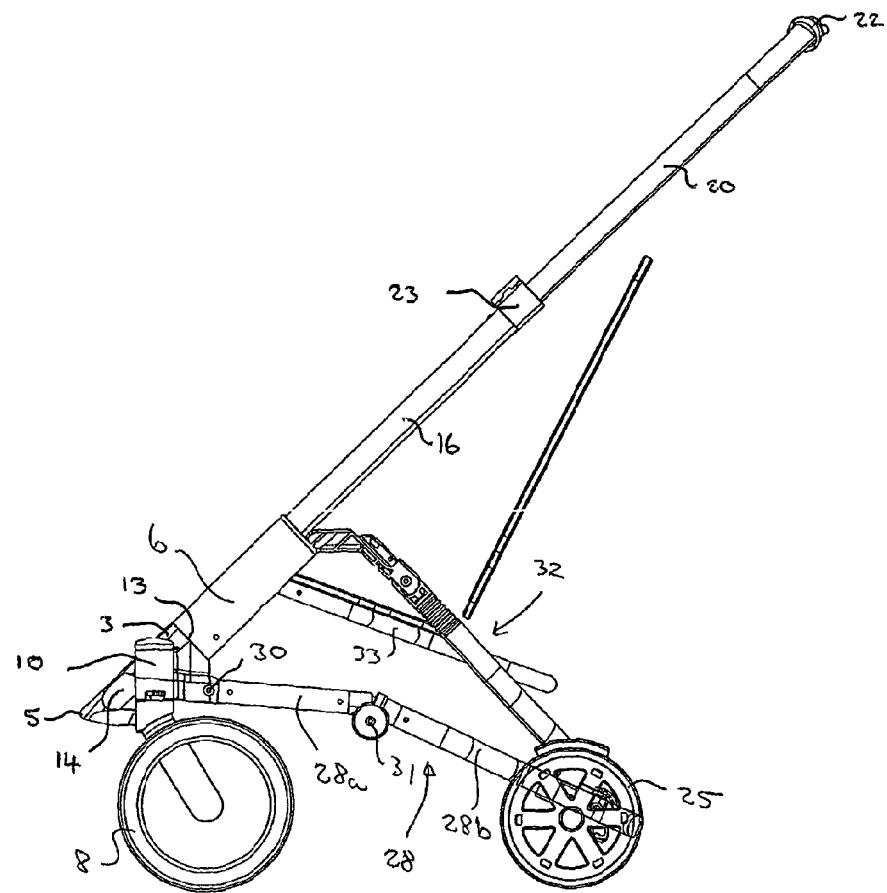
FIG. 2 is a side view of the pushchair as shown in FIG. 1.

The lower ends of a first handle portion 15 comprising separate elongate tubular members 16, 17 are slideably received in each of the tubular body portions 6, 7. In FIGS. 1 and 2, the first handle portion 15 is shown in its first or extended position in which each of the elongate tubular members 16, 17 of the first handle portion 15 extend primarily or wholly from the upper end 12 of their corresponding tubular body portions 6, 7. In this position, the lower end of each of the tubular members 16, 17 are received within the tubular portion of the chassis 2 and are prevented from being pulled all the way through the tubular body portions 6,7. In one embodiment, abutments or caps 18 (see FIGS. 3 and 4) are provided on the lower end of each tubular member 16, 17 which contact or engage with the chassis 2 when the first handle portion 15 is in its extended position so as to prevent the tubular members 16, 17 from being pulled through the tubular body portions 6, 7 and separated from the pushchair 1, as the diameter of the caps 18 is greater than the diameter of the aperture in the chassis sides 3,4. Alternatively, the diameter of the caps 18 is greater than the diameter of the aperture in the tubular body portions 6,7 but less than the diameter of the aperture in the chassis sides 3,4 so that the end caps 18 are received within or partially or wholly enclosed by the chassis sides 3,4 when the first handle portion 15 is fully extended.

A second handle part 19 extends from the upper end of each of the tubular members 16,17. The second handle part comprises two elongate members 20,21 that are slideably or telescopically received within respective tubular members 16,17. The second handle part 19 is U-shaped so that each of the elongate members 20,21 are connected together by a cross-member 22 which also forms the handle of the pushchair to enable it to be grasped by a user and pushed, or pulled, along.

In the extended position, as shown in FIGS. 1 and 2, a locking mechanism 23 locks the second handle part 19 to the first handle part 15 in its extended position. This locking mechanism 23 may take any convenient form but could, for example, comprise a sprung pin in each of the elongate members 20,21 of the second handle part 19 that engages in a corresponding aperture in each of the tubular members 16,17 of the first handle part 15 and which can be easily released by a user to enable the pushchair 1 to be collapsed. A similar locking mechanism (not shown) may connect the first handle part 15 to the chassis 2 when the first handle part 15 is in its extended position.

Figure 4:
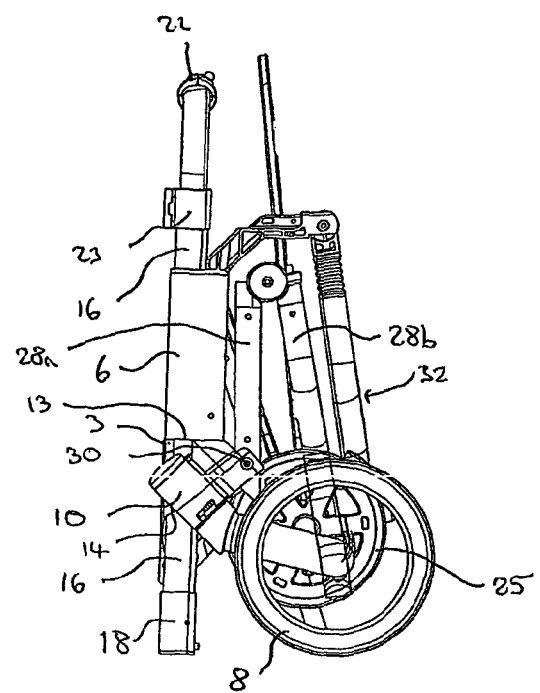
FIG. 4 is a side view of the pushchair as shown in FIG. 3.
Figure 5:
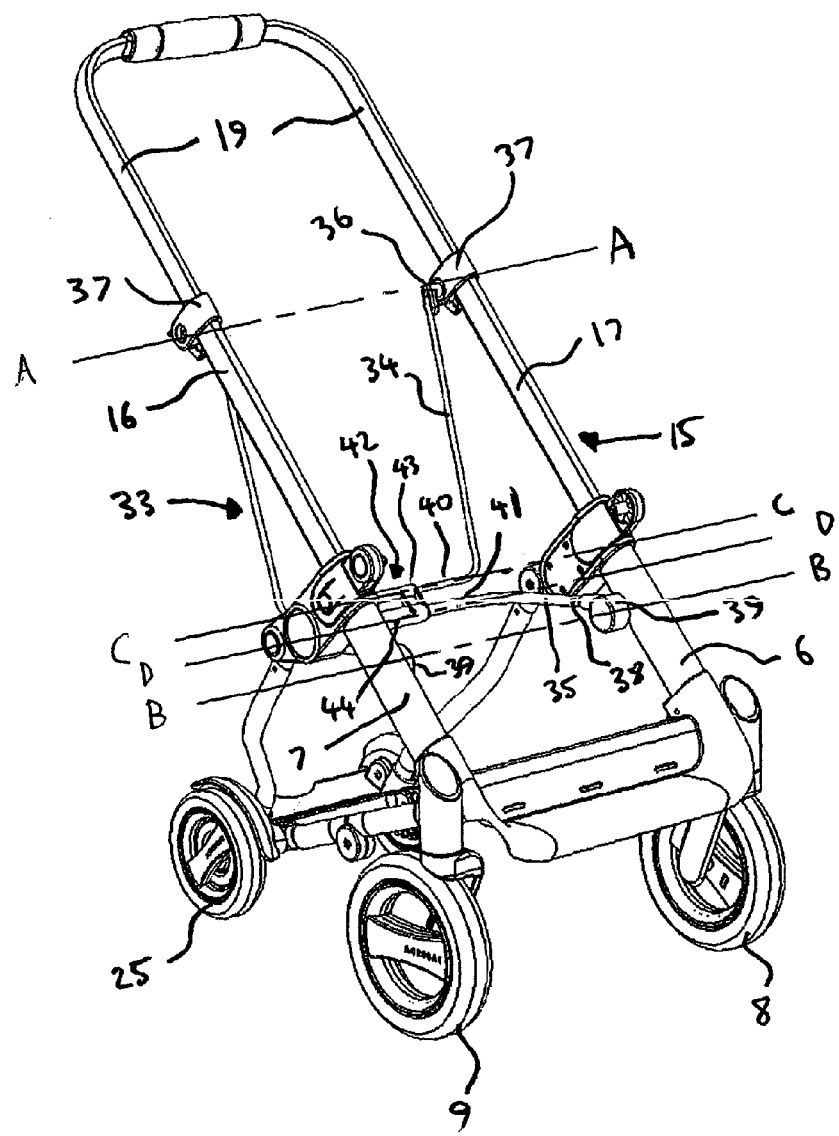
FIG. 5 is a front perspective view of the erected pushchair showing the seat hanger in more detail.
Figure 6:
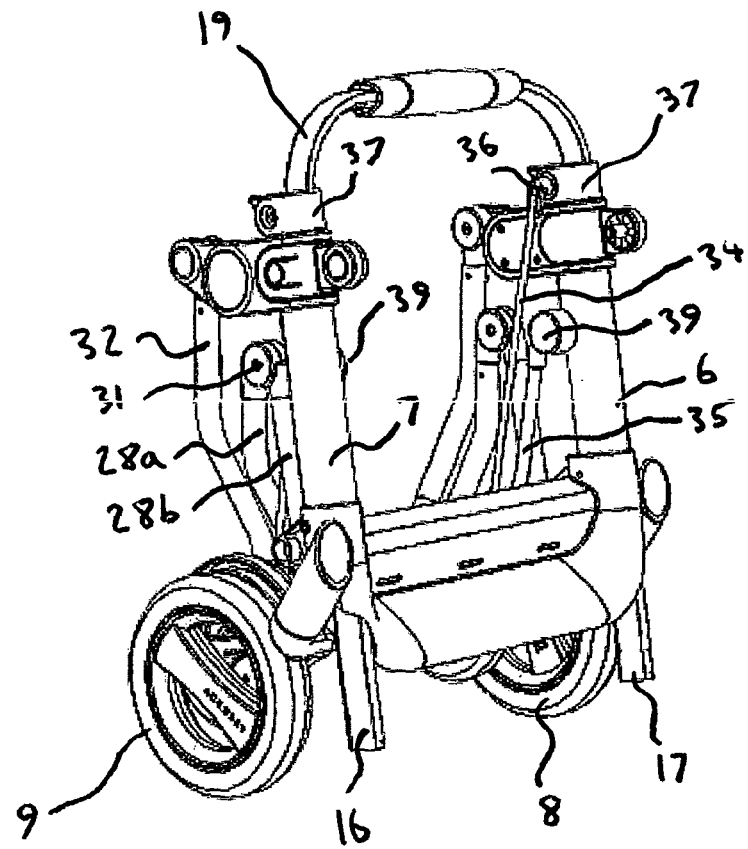
FIG. 6 is a front perspective view of the collapsed pushchair of FIG. 5.

With reference to FIGS. 4 and 5, it can be seen that when the pushchair 1 is collapsed, the tubular members 16,17 of the first handle part 15 slide through their respective tubular body portions 6,7 so that a portion, or at least a greater portion, of the first handle part 15 extends from the lower end of each of the tubular body parts 6,7 and chassis 2. In a preferred embodiment, the first handle part 15 slides through the tubular body parts 6,7 so that substantially the same length of each tubular member 16,17 extends from the upper and lower end 12,13 of each tubular body part 6,7, respectively, as can be seen most clearly from FIG. 4.

It will also be appreciated from FIG. 4 that the whole pushchair 1 can now be rotated or tipped forwardly on its wheels 8,9 so that the lower end of the first handle portion 15 or the end caps or abutments 18 on the lower end of the first handle portion 15 contact the ground in front of the wheels 8,9 and act as feet. In this position, the tubular body parts 6,7 and first handle part 15 are substantially upright or vertical. The pushchair 1 will stand freely of its own accord in this position.

Figure 3:
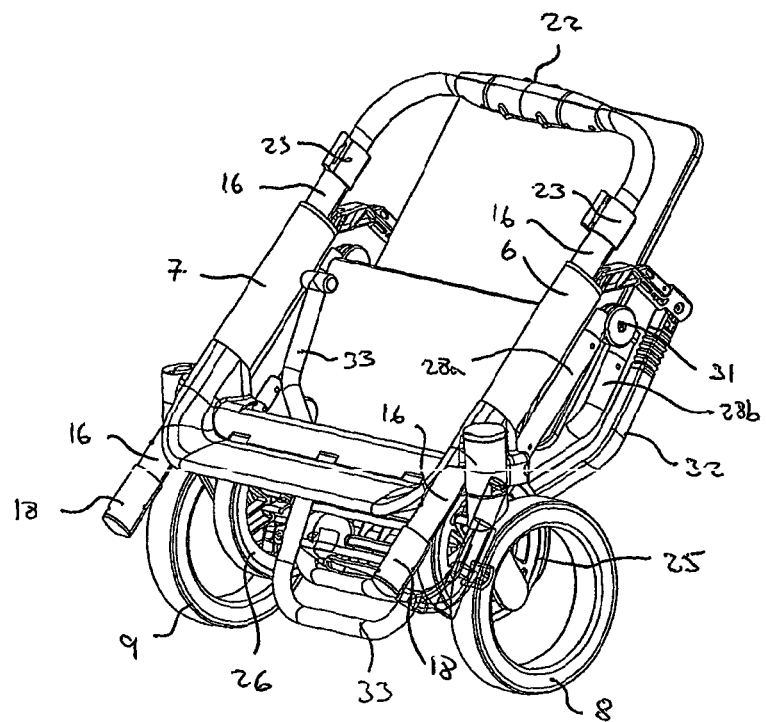
FIG. 3 is a schematic perspective view showing the pushchair of FIGS. 1 and 2 in its folded collapsed position.

As shown in FIGS. 3 and 4, the second handle part 19 slides into and is stowed within the first handle part 15 when the pushchair 1 is collapsed, thereby making the pushchair 1 as compact as possible. In this position, the cross-member 22 of the second handle part 19 is left protruding upwardly to provide a carrying handle for the pushchair when it is fully collapsed. Suitable locking means (not shown) are also provided to retain the first and second handle parts 15, 19 in their stowed positions, as shown in FIGS. 3 and 4.

It will be appreciated that there is no folding or pivoting of any part of the pushchair 1 that forms the handle 15,19. On the contrary, the first and second handle parts 15,19 only slide relative to each other and to the chassis 2 to which they are mounted as they move between their erect and collapsed positions.

The pushchair 1 also includes a pair of secondary or rear wheels 25,26 which are rotatable on an axle 27 and each mounted at the end of arms 28,29 hingedly attached to the chassis 2 behind the front wheels 8,9 by means of a pivot pin 30 on each side 3,4 of the chassis 2. Each arm 28,29 comprises two portions 28a,28b;29a,29b hingedly attached to each other at pivot 31 so that the rear axle 27, together with the rear wheels 25,26, can be pushed towards the front wheels 8,9 when the pushchair 1 is collapsed with the two portions 28a,28b;29a,29b of each arm 28,29 folding towards each other so that they extend substantially parallel to the tubular body portions 6,7 in a stowed position, as shown in FIG. 4. The distance between each of the rear wheels 25,26 is less than the distance between each of the front wheels 8,9 so that the rear wheels 25,26 locate in the space between the front wheels 8,9.

A stay or leg 32 extends from the axle 27 to which the rear wheels 25,26 are mounted to the upper end 13 of the tubular body portion 6,7 on each side of the pushchair 1. The stay 32 has a first portion 32a extending from the upper end of the tubular body portion 6,7 and a second portion 32b pivotally connected to the free end of the first portion 32a so that the second portion 32b pivots about the first portion 32a when the rear wheels 25,26 are moved towards their stowed position between the front wheels 8,9. The arms 28,29 are received in a space formed between the tubular body portion 6,7 and the stay 32 on each side of the pushchair 1. A locking mechanism (not shown) is provided to lock the secondary wheels 25,26 in each of their extended and stowed positions.

In FIGS. 1 to 4, a seat hanger 33 formed from a seat base 34 and seat back 35 are only shown in general form. A more detailed description of the seat hanger 33 will now be described with reference to FIGS. 5 to 7G.

FIG. 5 shows a perspective view of a pushchair according to the invention in an erect state and from which it can be seen that the seat hanger 33 has a first portion 34 and a second portion 35, each of the first and second portions 34,35 being formed by a substantially U-shaped rigid frame.

The first portion 34 has upper ends 36, each of which are pivotally mounted to respective elongate tubular members 16, 17 of the first handle portion 15 via clamping members 37. The first portion 34 is thereby able to rotate relative to the first handle portion 15 about an axis A-A, as shown in FIG. 5.

The second portion 35 has front ends 38, each of which are pivotally mounted to respective tubular body portions 6,7 via mounts 39, for rotation of the second portion 35 about an axis B-B, as shown in FIG. 5.

A lower end 40 of the first portion 34 and rear end 41 of the second portion 35 are pivotally coupled to each other via a coupling member 42. The coupling member 42 comprises a first seat 43 to receive the lower end 40 of the first portion 34 and a second seat 44 to receive the rear end 41 of the second portion 35. The lower end 40 can rotate about an axis C-C within its seat 43 and the rear end 41 can rotate about an axis D-D within its seat 44. The first and second seats 44, 45 are parallel but spaced from each other by a short distance so that the first and second portions can freely rotate relative to each other and relative to the coupling member 42.

The axes A-A, B-B, C-C and D-D are all parallel to each other.

Although not shown in the Figures, a flexible material seat and backrest may be stretched over and attached to the seat hanger 33 to provide a comfortable seat on which an infant may sit.

Collapsing of the pushchair will now be described in more detail, with reference to FIGS. 7A to 7G.

Figure 7A:
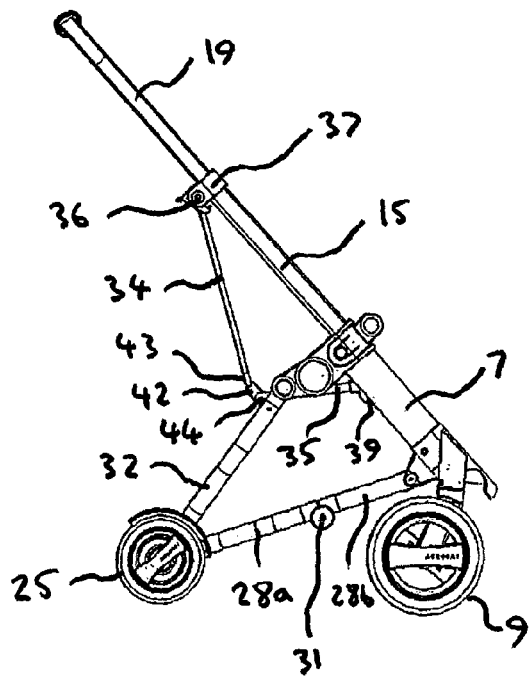
FIG. 7A to 7G show a series of side elevations of the pushchair of FIGS. 5 and 6, starting in an erect state and finishing in its collapsed state.
Figure 7B:
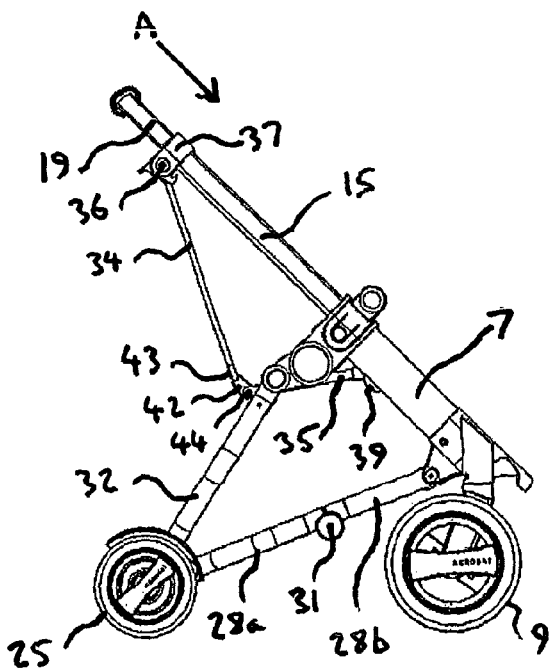
Figure 7C:
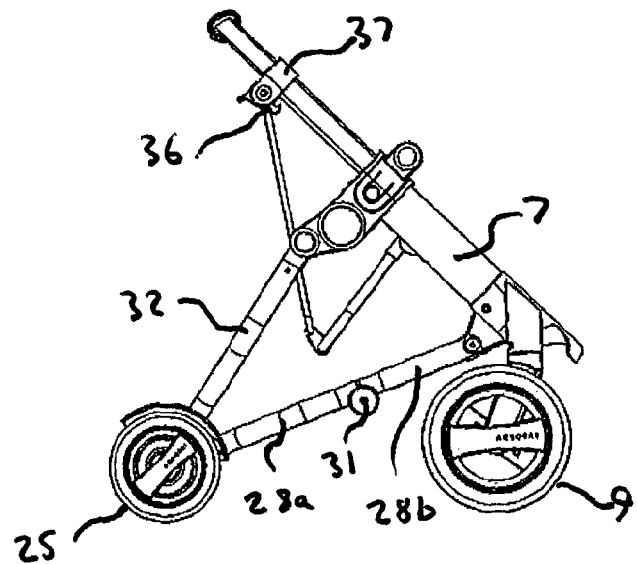

A user initially releases the second handle part 19 and slides it in the direction of arrow A (see FIG. 7B) into the first handle part 15. When the second handle part 19 has been slid fully home into the first handle part 15, continued force on the second handle part 19 in the same direction causes the first handle part 15 to slide through the tubular body portions 6,7, as has previously been described. As shown in FIG. 7C, movement of the first handle part 15 causes the clamping members 37 to slide linearly towards the mounts 39. At the same time, the upper ends 36 of the first portion 34 of the seat hanger pivot relative to the first handle part 15 about axis A-A, the lower end of the first portion 34 pivots relative to the coupling member 42 about axis C-C, the rear end 41 of the second portion 35 pivots relative to the coupling member 42 about axis D-D and, the front end 38 of the second portion 35 pivots relative to the tubular members 6,7 about the mounts 39 about axis B-B.

Figure 7D:
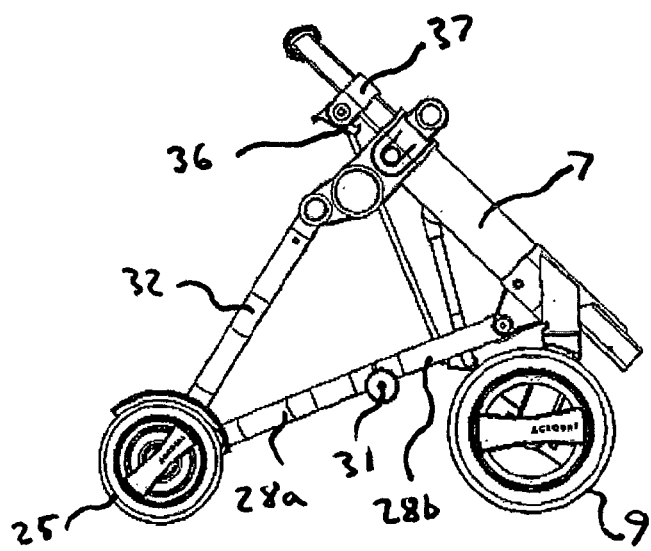
Figure 7E:
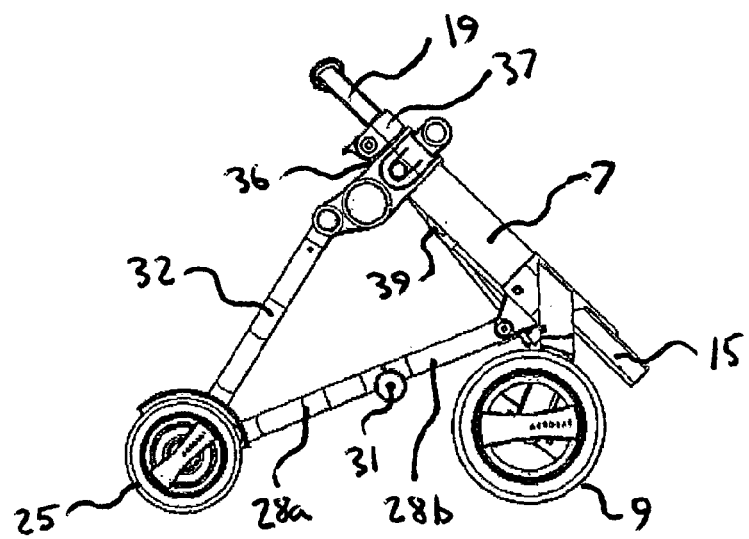

As shown in FIGS. 7D and 7E, the first and second portions 34,35 of the seat hanger 33 fold substantially against each other and are stowed between the tubular body portions 6,7 when completely folded away, as shown in FIG. 7E.

Figure 7F:
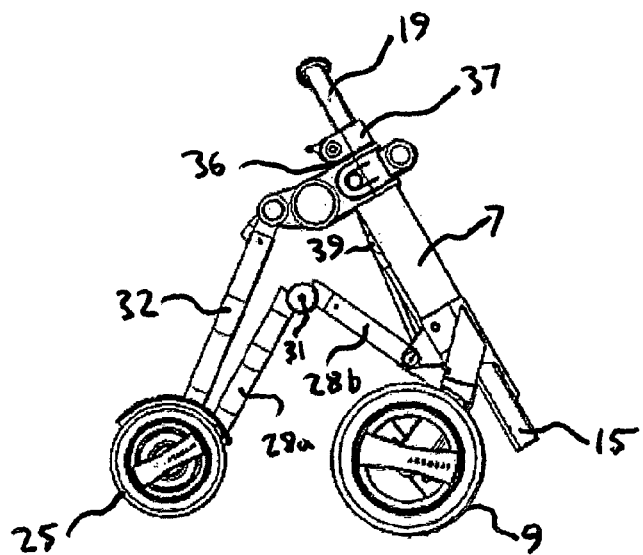
Figure 7G:
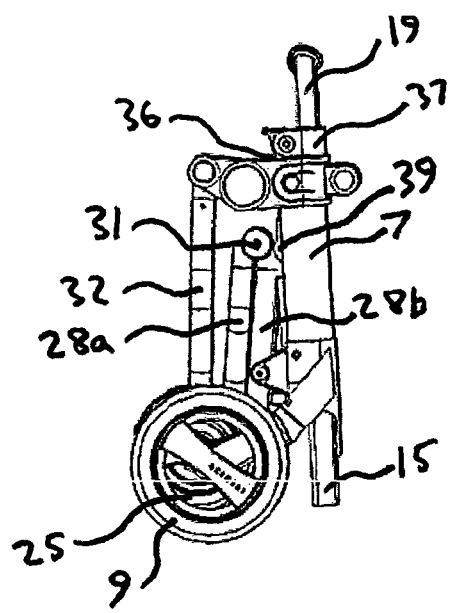

Once the handle 15,19 has been fully stowed, the rear wheels 25 can be folded up between the front wheels 8,9, as shown in FIGS. 7F and 7G, and as previously explained above in connection with FIGS. 1 to 4.

Opening of the pushchair is carried out in reverse and it will be appreciated that the seat hanger 33 opens to form the seat as a result of sliding the first handle portion 15 out of the tubular members 6,7.

The puschair of the present invention is compact as well as being easy to erect and collapse. In particular, the seat hanger 33 is configured such that it collapses and erects in response to collapsing and erection, respectively, of the pushchair, so no additional steps are required to fold and/or remove the seat.

It will be appreciated that the embodiments described above are given by way of example only and that other modifications falling within the scope of the appended claims are also considered to be part of the present invention.

The invention claimed is:
1. A collapsible pushchair comprising a chassis to which wheels are attached, a seat hanger comprising first and second portions pivotally connected to each other and a pair of spaced parallel tubular body portions fixed relative to and extending upwardly at an angle from the chassis away from the wheels on opposite sides of said seat hanger, a first handle part received in each tubular body portion and slideable between an extended position in which the first handle part primarily extends from an upper end of the tubular body portion towards a person pushing the pushchair and, a second stowed position in which the first handle part has been slid through each tubular body portion so that the first handle part extends from the upper end and a lower end of each of the tubular body portions, wherein the first portion of the seat hanger is pivotally attached to said first handle parts at a first pivot point,
wherein the second portion is pivotally connected to the tubular body portions at a second pivot point, the first and second pivots points moving linearly towards each other so that the first and second portions of the seat hanger fold substantially against each other as the first handle parts are slid into their stowed position from their extended position.
2. A collapsible pushchair according to claim 1, wherein the first and second portions substantially lie between the pair of spaced parallel tubular body portions when the first handle parts are in their stowed position.
3. A collapsible pushchair according to claim 1, wherein the seat hanger comprises a coupling member that pivotally couples the lower end of said first portion to the rear end of said second portion.
4. A collapsible pushchair according to claim 3, wherein the coupling member comprises spaced parallel seats to receive and pivotally mount the lower end of the first portion and the rear end of the second portion, respectively.
5. A collapsible pushchair according to claim 4, wherein the first and second portions each comprises rigid U-shaped frame members and the coupling member extends between a base part of each U-shaped frame member to couple said U-shaped frame members together with their base parts in spaced parallel relation.
6. A collapsible pushchair according to claim 5, wherein the first U-shaped frame member is coupled to the coupling member for rotation about a first axis and the second U-shaped frame member is coupled to the coupling member for rotation about a second axis parallel to and spaced from the first axis.
7. A collapsible pushchair according to claim 6, wherein respective ends of the U-shaped frame member of the first portion are attached to respective first handle portions for rotation about a first common axis.
8. A collapsible pushchair according to claim 7, wherein respective ends of the U-shaped frame member formed by the second portion are attached to respective spaced tubular body portions for rotation about a second common axis.
9. A collapsible pushchair according to claim 7, wherein the first axis, the second axis and the first and second common axes are all parallel to each other.
10. A collapsible pushchair according to claim 5, comprising a flexible seating material attachable to the U-shaped frame members to provide a seat and a backrest, wherein the flexible seating material folds up with the U-shaped frame members when the first handle parts are slid into their stowed position.

11. A collapsible pushchair according to claim 1, wherein the tubular body portions and the first handle parts are configured such that substantially the same length of the first handle parts protrude from the upper and lower ends of each tubular body portion when the first handle parts are in their second stowed position.
12. A collapsible pushchair according to claim 1, wherein the tubular body portions and the first handle parts are configured such that, when the first handle parts have been slid through each of their respective tubular body portions into their stowed positions, the pushchair can be tipped into an upright position in which it is supported on said wheels with the first handle parts protruding from respective lower ends of the tubular body portions.
13. A collapsible pushchair according to claim 12, wherein the lower ends of each of the first handle parts are received within their corresponding tubular body portions when the first handle parts are in their extended position.
14. A collapsible pushchair according to claim 12, wherein the lower ends of each of the first handle parts protrude from the lower end of each of the tubular body portions when the first handle parts are in their extended position.
15. A collapsible pushchair according to claim 13, wherein end caps are attached each of the lower ends of the first handle parts to prevent the first handle parts from being pulled through their respective tubular body portions when the first handle parts are extended.
16. A collapsible pushchair according to claim 15, wherein the end caps comprise feet to support the pushchair in an upright position when the first handle parts are in their stowed position.
17. A collapsible pushchair according to claim 1, comprising a locking mechanism to lock the first handle parts in their extended and stowed positions within the tubular body portions.
18. A collapsible pushchair according to claim 1, wherein the first handle parts are attached to each other or are integrally formed so that they slide together from their extended into their stowed position.
19. A collapsible pushchair according to claim 1, comprising second handle parts, the second handle parts being slideable between a first position in which they extend upwardly from respective ends of the first handle parts towards a person pushing the pushchair and a retracted position in which the second handle parts are received within respective first handle parts.
20. A collapsible pushchair according to claim 18, wherein the first handle parts each comprise a tubular member received in a respective tubular body portion and the second handle part comprises a U-shaped frame member that extends from the upper ends of each of the tubular members and connects them together so that, when the second handle part is retracted within the tubular members, further downward force on the second handle part simultaneously pushes both tubular members through their respective tubular body portions so that both of the first handle parts are moved from their extended toward their retracted position.
21. A collapsible pushchair according to claim 1, wherein the wheels comprise a primary wheel attached to the chassis adjacent to the lower end of each of the tubular body portions.
22. A collapsible pushchair according to claim 21, comprising a pair of secondary wheels located behind the primary wheels and stowable between the primary wheels when the pushchair is collapsed.
23. A collapsible pushchair according to claim 22, comprising a pair of parallel arms extending from the chassis, a secondary wheel being connected to each of said arms.

24. A collapsible pushchair according to claim 23, wherein each of said arms are pivotally mounted to the chassis and comprise two portions pivotally connected to each other such that the each arm pivots relative to the chassis and the two portions pivot relative to each other when the secondary wheels are moved into their stowed position between the primary wheels.

25. A collapsible pushchair according to claim 24, comprising a stay extending between each of the secondary wheels and the upper end of the tubular body portion.

26. A collapsible pushchair according to claim 25, wherein the stay is pivotally attached to the tubular body portion such that the stay pivots relative to the tubular body portion when the secondary wheels are moved into their stowed position between the primary wheels.

27. A collapsible pushchair according to claim 26, wherein the pivotal attachment of the stay to the tubular body portion is spaced from the tubular body portion in a direction towards the secondary wheels to provide a space between the tubular body portion and the stay to receive the arms when the secondary wheels are received in their stowed position between the primary wheels.

* * * * *